May 26, 1925.

M. P. SMITH 1,538,957

FRUIT EVAPORATOR

Filed Feb. 25, 1924

Inventor
Mary P. Smith
By A. J. O'Brien
Attorney

Patented May 26, 1925.

1,538,957

UNITED STATES PATENT OFFICE.

MARY PARKER SMITH, OF DENVER, COLORADO.

FRUIT EVAPORATOR.

REISSUED

Application filed February 25, 1924. Serial No. 694,870.

*To all whom it may concern:*

Be it known that I, MARY PARKER SMITH, a citizen of the United States, residing at Denver, the city and county of Denver, and State of Colorado, have invented certain new and useful Improvements in Fruit Evaporators; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to evaporators for fruits.

In many parts of the county, where fruit is available, it is customary for housewives to prepare preserves, jellies and similar food products. In places where there is sufficient sunshine the fruit is exposed to the sun's rays whereby the liquid contained therein is evaporated to such an extent that the preserves are given the proper consistency. In the ordinary method of evaporation, the time required often runs into days, three days being frequently necessary. With my improved evaporator I have been able to obtain the required evaporation in three hours and to get a better product than has heretofore been obtained in three days.

My invention resides in the peculiar construction of my evaporator, which, briefly described, consists of a box of substantially rectangular construction and formed of any suitable material such as porcelain, pyrex, enameled metal or aluminum. The box is higher on one end than the other and the sides connecting the ends are inclined. The upper edge of both sides and ends have a rabbet along the inside for the reception of a glass cover. Along the inner surface of the lower end is a gutter which extends the entire width of the box and serves to receive the water that condenses on the inner surface of the glass cover.

My invention can be best described and will be most readily understood when reference is had to the accompanying drawing in which the preferred embodiment thereof is shown, and in which.

Figure 1:
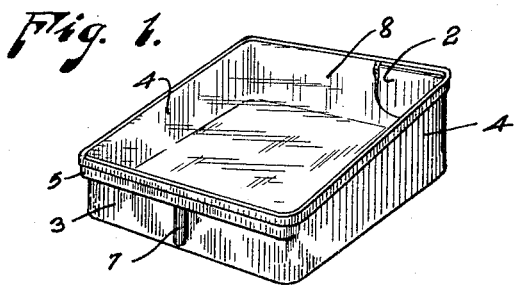
Fig. 1 shows a perspective view of the evaporator.
Figure 2:
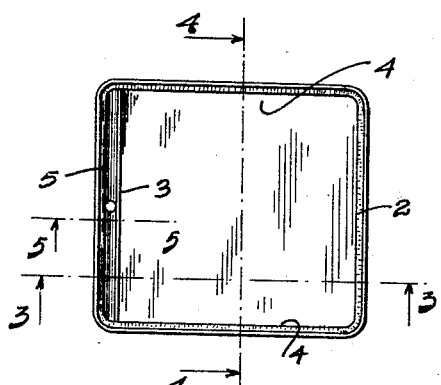
Fig. 2 is a top plan view thereof.
Figure 3:
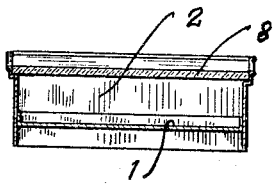
Fig. 3 is a section taken on line 3—3, Fig. 2.
Figure 4:
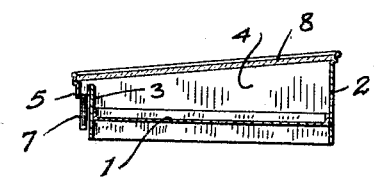
Fig. 4 is a section taken on line 4—4, Fig. 2.
Figure 5:
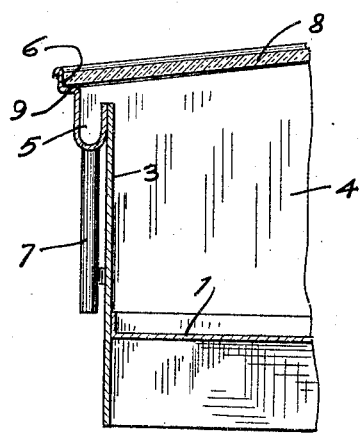
Fig. 5 is a section on line 5—5, Fig. 2, showing the parts on an enlarged scale.

My improved evaporator may be made of any suitable material, as noted above, but has been shown as constructed from sheet aluminum. The evaporator is preferably square or rectangular with rounded corners, although it may be made round or any other shape and has a bottom 1, end walls 2 and 3, and sides 4. The bottom is secured to the sides and ends a short distance above the lower edge of the latter so that it will be spaced a short distance from any flat surface upon which the evaporator may be placed. The end 3 has secured to the outside thereof near its upper edge a gutter 5 whose upper edge is offset as shown at 6 in Fig. 5. The gutter has an opening in its bottom and a short tube 7 is secured to the opening. The end 2, which is opposite end 3, is higher and is joined to the latter by sides 4. The upper edge of the sides and the end 2 are provided with an offset similar to that indicated by 6 in Fig. 5. A glass plate 8 of the proper size is formed to fit snugly within the vertical edges of the offset portions and to rest upon the shoulder 9. The end 3 is of such height that it does not quite reach the underside of the glass (Fig. 3). This permits water that condenses on the under side of the glass to flow downwardly and into the gutter, from which it escapes through the tube 7.

When my device is to be used for the preparation of preserves, for example strawberry preserves, the berries and the sugar are subjected to heat and brought to a boil. They are then placed within my evaporator and the glass cover put into place. The evaporator is then placed in the sun so that the sun's rays strike the glass. The action of the sun's rays causes the liquid to evaporate quite rapidly. The evaporator and contents are left exposed to the sun until the preserves reach the proper consistency. The vapors that arise from the preserves condense on the inside of the glass and flow downward and out in the manner explained.

The rapid action of my evaporator is believed to be due to the fact that the glass conserves the heat and to the additional fact that the vapors are condensed and carried away. It is evident that if the preserves were placed in a container and covered by a glass and no provision made for removing the moisture, the air would soon become saturated and the evaporation cease. It is very important therefore that the glass cover shall be inclined and that the box shall be provided with a gutter for receiving the condensed moisture, as by this means it is possible to maintain the air dry and the evaporation at a maximum.

Having now described my invention, what I claim as new is:

A fruit evaporator comprising a box-like casing having an inclined glass top, a gutter applied exteriorly to the top portion of the shorter upright side wall of the structure, the lower portion of the glass top projecting laterally beyond the said wall and overhanging the gutter, the said wall being shortened at the top to leave a space between its upper edge and the glass cover, said space establishing communication between the casing chamber and the gutter, the outer wall of the gutter extending upwardly above the inner wall thereof and forming a support for the adjacent overhanging part of the glass top, and forming therewith a tight joint, the gutter having an outlet for water of evaporation which passes thereto from the under surface of the glass.

In testimony whereof I affix my signature.

MARY PARKER SMITH.